US 9,278,635 B2

(12) United States Patent
Humer

(10) Patent No.: US 9,278,635 B2
(45) Date of Patent: Mar. 8, 2016

(54) ADJUSTABLE HEAD RESTRAINT ASSEMBLY

(71) Applicant: Lear Corporation, Southfield, MI (US)

(72) Inventor: Mladen Humer, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 151 days.

(21) Appl. No.: 14/159,112

(22) Filed: Jan. 20, 2014

(65) Prior Publication Data

US 2014/0210243 A1    Jul. 31, 2014

Related U.S. Application Data

(60) Provisional application No. 61/758,324, filed on Jan. 30, 2013.

(51) Int. Cl.
*B60N 2/48* (2006.01)

(52) U.S. Cl.
CPC .............. *B60N 2/4864* (2013.01); *B60N 2/485* (2013.01); *B60N 2/4811* (2013.01); *B60N 2/4814* (2013.01); *B60N 2/4817* (2013.01)

(58) Field of Classification Search
CPC .. B60N 2/4814; B60N 2/4817; B60N 2/4811; B60N 2/4864; B60N 2/485
USPC .......................................... 297/409, 391, 410
See application file for complete search history.

(56) References Cited

U.S. PATENT DOCUMENTS

| 1,471,168 | A | 10/1923 | Katz |
| 4,191,422 | A | 3/1980 | Inasawa et al. |
| 4,265,482 | A | 5/1981 | Nishimura et al. |
| 4,278,291 | A | 7/1981 | Asai |
| 4,540,217 | A | 9/1985 | Suzuki |
| 4,657,304 | A | 4/1987 | Heesch et al. |
| 4,657,425 | A * | 4/1987 | Takahashi ...................... 403/104 |
| 5,666,861 | A * | 9/1997 | Fee et al. ......................... 74/523 |
| 5,967,613 | A | 10/1999 | McKeever |
| 6,899,395 | B2 | 5/2005 | Yetukuri et al. |
| 6,983,995 | B1 | 1/2006 | Veine et al. |
| 7,073,863 | B1 | 7/2006 | Low et al. |

(Continued)

FOREIGN PATENT DOCUMENTS

| GB | 000562608 A * | 7/1944 |
| WO | 2004089688 A1 | 10/2004 |

(Continued)

OTHER PUBLICATIONS

Humer et al., U.S. Appl. No. 14/159,985, entitled "Adjustable Head Restraint Assembly", filed Jan. 21, 2014, 13 pages.

*Primary Examiner* — Milton Nelson, Jr.
(74) *Attorney, Agent, or Firm* — Brooks Kushman P.C.

(57) ABSTRACT

A head restraint assembly is provided with a first guide member mounted proximate to a vehicle seat back. A second guide member is mounted to the first guide member for translation along the first guide member. A locking mechanism is mounted to the second guide member in cooperation with the first guide member for locking the second guide member relative to the first guide member. The first and second guide members are connected by at least one spherical bushing. A torsion spring is connected to the first guide member and oriented about the second guide member for locking the second guide member relative to the first guide member.

20 Claims, 6 Drawing Sheets

(56) References Cited

U.S. PATENT DOCUMENTS

| | | |
|---|---|---|
| RE40,527 E | 10/2008 | Veine et al. |
| 7,631,932 B2 | 12/2009 | Hoffmann |
| 8,348,348 B2 | 1/2013 | Eckstein et al. |
| 8,833,860 B2 | 9/2014 | Fey et al. |
| 8,882,193 B2 | 11/2014 | Fröse et al. |
| 8,950,815 B2 | 2/2015 | Wang et al. |
| 2006/0250017 A1 | 11/2006 | Otto et al. |
| 2008/0296953 A1 | 12/2008 | Veine et al. |
| 2009/0058162 A1 | 3/2009 | Boes et al. |
| 2009/0146479 A1 | 6/2009 | Boes et al. |
| 2010/0270841 A1 | 10/2010 | Sobieski et al. |
| 2010/0270842 A1 | 10/2010 | Mueller et al. |
| 2011/0109143 A1* | 5/2011 | Maddelein et al. .......... 297/404 |
| 2012/0080922 A1 | 4/2012 | Fey et al. |

FOREIGN PATENT DOCUMENTS

| | | |
|---|---|---|
| WO | 2007073034 A1 | 6/2007 |
| WO | 2012097990 A1 | 7/2012 |

* cited by examiner

ADJUSTABLE HEAD RESTRAINT ASSEMBLY

CROSS-REFERENCE TO RELATED APPLICATIONS

This application claims the benefit of U.S. provisional application Ser. No. 61/758,324 filed Jan. 30, 2013, the disclosure of which is hereby incorporated in its entirety by reference herein.

TECHNICAL FIELD

Embodiments relate to adjustable head restraint assemblies.

BACKGROUND

An adjustable head restraint assembly is disclosed in Low et al. U.S. Pat. No. 7,073,863 B1, which issued on Jul. 11, 2006.

SUMMARY

According to at least one embodiment, a head restraint assembly is provided with a first guide member mounted proximate to a vehicle seat back. A second guide member is mounted to the first guide member for translation along the first guide member. A locking mechanism is mounted to the second guide member in cooperation with the first guide member for locking the second guide member relative to the first guide member. The first and second guide members are connected by at least one spherical bushing.

According to at least another embodiment, a head restraint assembly is provided with a first guide member mounted proximate to a vehicle seat back. A second guide member is mounted to the first guide member for translation along the first guide member. A torsion spring is connected to the first guide member and oriented about the second guide member for locking the second guide member relative to the first guide member. At least one spherical bushing is mounted about the second guide member and received within the first guide member.

DETAILED DESCRIPTION

Figure 2:
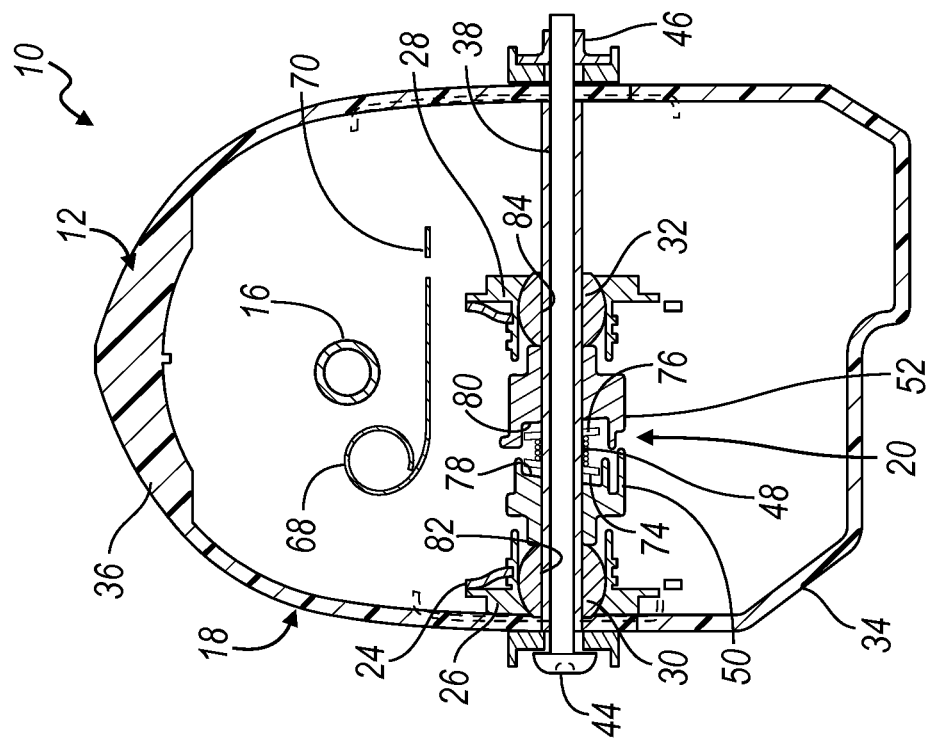
FIG. 2 is a partial section view of the head restraint assembly of FIG. 1, illustrating a guide assembly and a locking mechanism.
Figure 1:
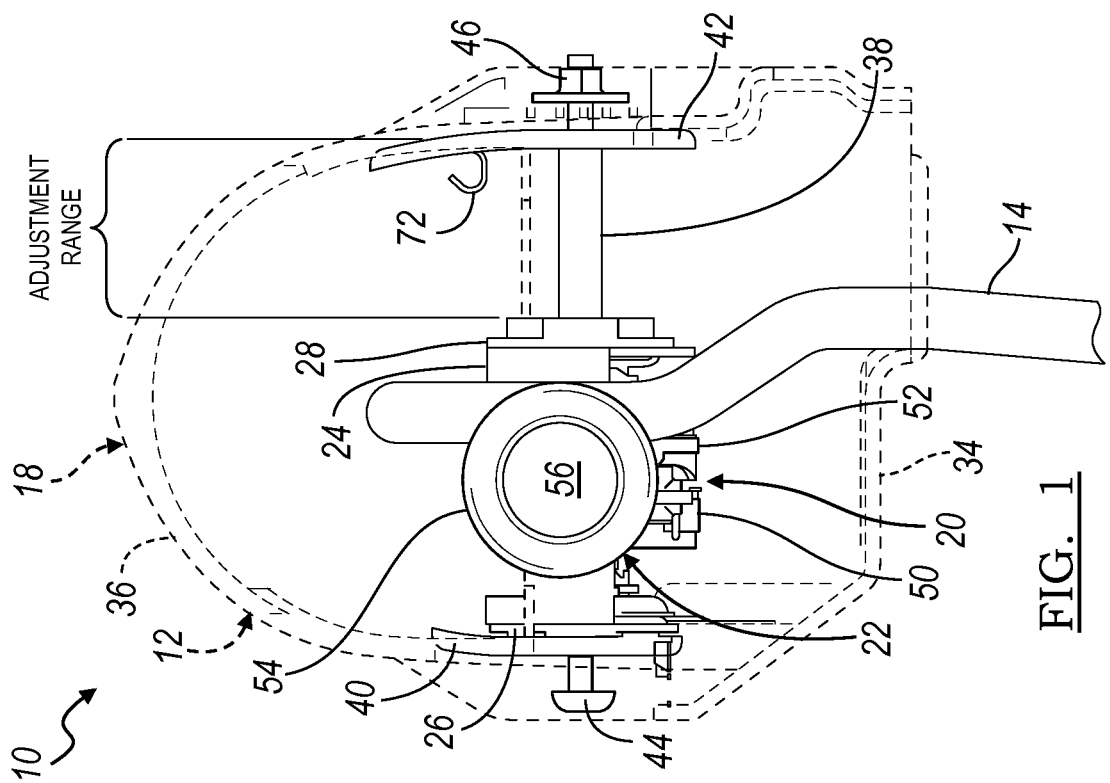
FIG. 1 is a side elevation view of an adjustable head restraint assembly according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-4, a movable head restraint assembly is illustrated and referenced generally by numeral 10. The head restraint assembly 10 is provided adjacent a seatback of a vehicle seat; and may be mounted directly to the vehicle seat or directly to the vehicle body adjacent the seatback for supporting the head of an occupant. The seat assembly may be for a vehicle such as a car, truck, aircraft, watercraft, or the like. The movable head restraint assembly 10 is illustrated including a head restraint 12 provided upon a support post 14.

The support post 14 maybe fixed relative to the vehicle or the vehicle seat back. The support post 14 may be received within a guide sleeve for upright adjustment relative to the seatback. The support post 14 may have any suitable configuration. For example, one or more support posts 14 may extend from the head restraint 12. Moreover, the support post 14 may be formed integrally with another support post 14 with a crossbar 16 interconnecting and spacing apart the support posts 14. The support posts 14 may be made of any suitable material or materials such as a metal or metal alloy.

The head restraint 12 may include a trim cover (not shown) for enclosing foam (also not shown), a housing 18, and a locking mechanism 20. A manual button assembly 22 extends from the housing 18 in the trim cover for manual actuation for disengaging the locking mechanism 20. The button assembly 22 is illustrated oriented to be manually actuated by being pressed in a lateral direction of the head restraint 12. Pressing the button assembly 22 releases the locking mechanism 20 and permits movement of the head restraint 12 relative to the support posts 14 in a fore and aft direction, which may be horizontal. In FIGS. 1-4, the head restraint 12 is illustrated at a limit in one direction, the aft direction, relative to the vehicle. Thus, by depressing the button assembly 22, the occupant may move the head restraint 12 in the fore direction from the position depicted, or to multiple, non-incremental positions therebetween.

Figure 3:
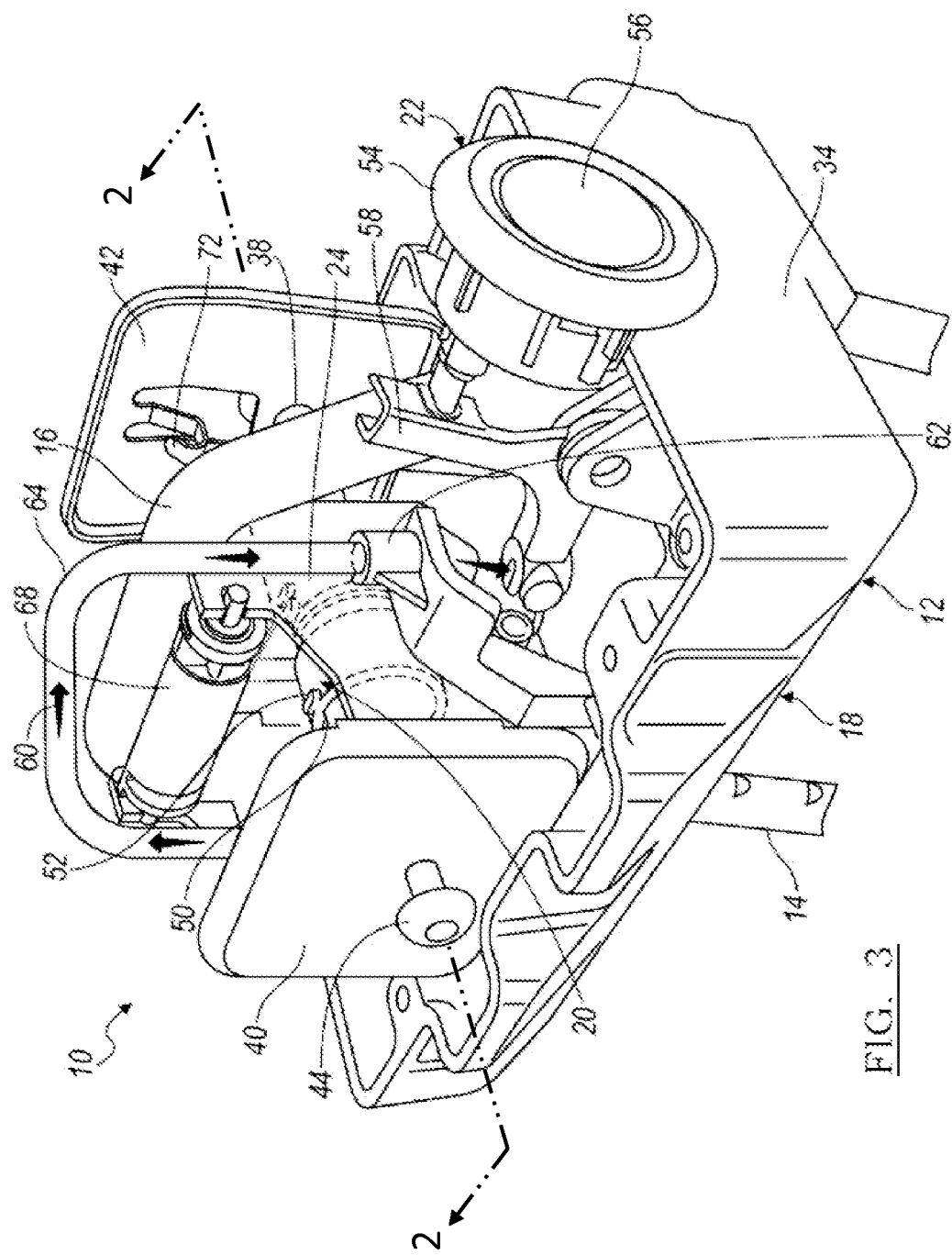
FIG. 3 is a partial front perspective view of the head restraint assembly of FIG. 1.
Figure 4:
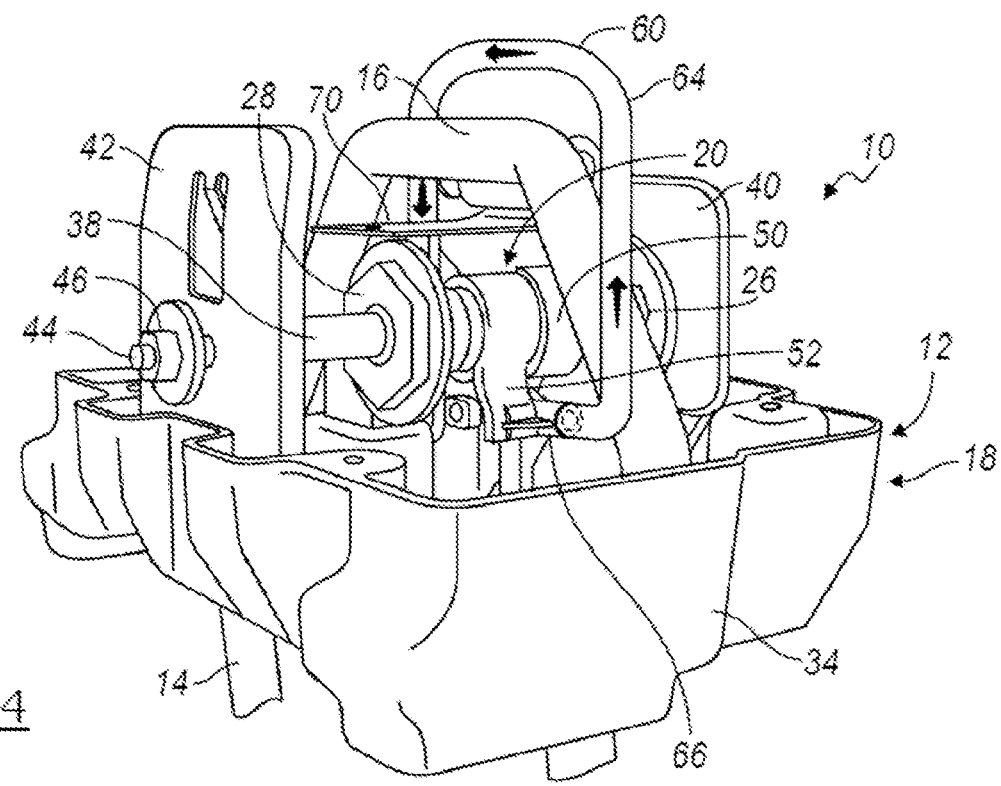
FIG. 4 is a partial rear perspective view of the head restraint assembly of FIG. 1.
Figure 5:
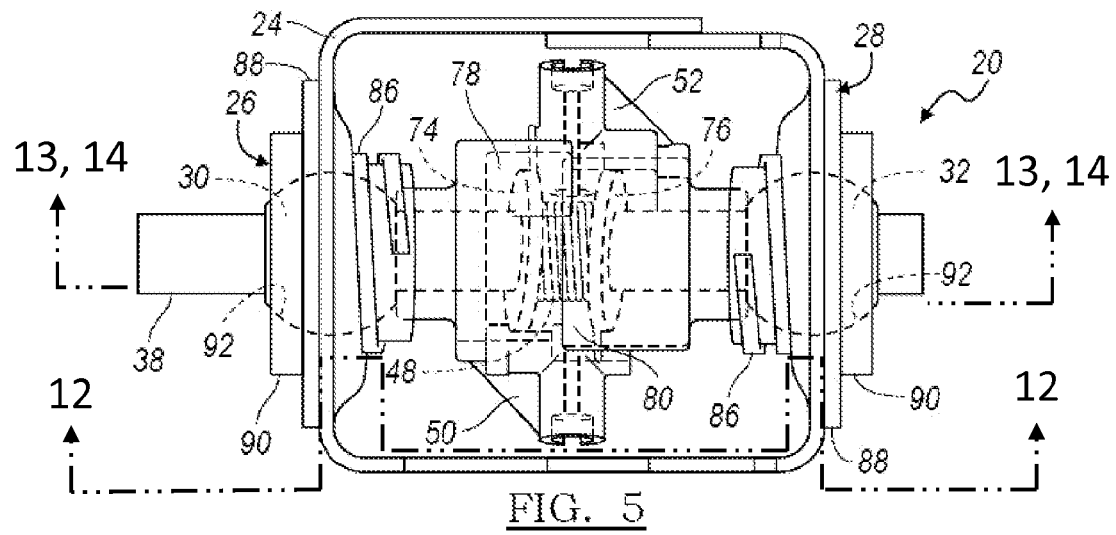
FIG. 5 is a top view of the locking mechanism of FIG. 2.
Figure 12:
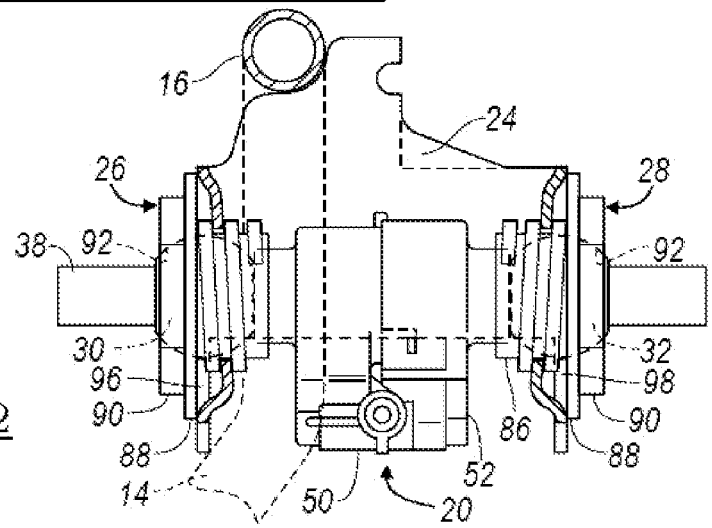
FIG. 12 is a side view of the guide assembly of FIG. 2.

With reference specifically to FIGS. 3, 5 and 12, a frame 24 is mounted to the crossbar 16 for supporting the head restraint 12. The frame 24 supports a pair of nuts 26, 28, (FIGS. 1, 2, 4-6 and 8-14) which are each threaded into the frame 24. The nuts 26, 28 each retain a bushing 30, 32 (FIGS. 2, 5, 6, and 9-14) with the locking mechanism 20 oriented therebetween.

The housing 18 includes a pair of shells 34, 36, which are sized to mate and retain the components of the head restraint 12 therein. The upper shell 36 is illustrated removed in FIGS. 3 and 4. Both shells are illustrated removed in FIGS. 5-12. A guide shaft 38 extends in a fore and aft direction of the head restraint 12. The guide shaft 38 is mounted to the shells 34, 36 by a pair of brackets 40, 42, which are retained within the shells 34, 36. Referring again to FIGS. 2-4, a through bolt 44 extends through the upper shell 36, the bracket 40, the nut 26 and bushing 30, the locking mechanism 20, the nut 28 and bushing 32, the bracket 42, the upper shell 36 again, and a nut 46. The guide shaft 38 cooperates with the bushings 30, 32 for translation of the guide shaft 38, and consequently the head restraint 12, relative to the bushings 30, 32 and the support posts 14 for adjustment of the head restraint 12 relative to the support posts 14.

The locking mechanism 20 includes a torsion spring 48 (FIGS. 2, 5 and 6) oriented about the guide shaft 38 and sized to tighten about the guide shaft 38 and lock to a position upon the guide shaft 38. Each end of the torsion spring 48 is connected to a lever 50, 52, (FIGS. 2-6 and 10-12) which are each also pivotally connected to the guide shaft 38 and are oriented between the bushings 30, 32. Counter rotation of the levers 50, 52 expands the torsion spring 48, thereby unlocking the torsion spring 48 from the guide shaft 38 for permitting movement of the guide shaft 38 and consequently the head restraint 12 relative to the support post 14.

The button assembly 22 (FIGS. 1 and 3) includes a bezel 54 mounted to the shells 34, 36. A button 56 is mounted in the bezel 54 for linear translation, which pivots a lever 58 (FIG. 3) that is pivotally connected to the lower shell 34. Referring now to FIGS. 3 and 4, a cable 60 is connected to the lever 58 and extends to a boss 62 (FIG. 3) that is provided upon the lower shell 34. A cable sheath 64 extends from the boss 62 to a boss 66 (FIG. 4) on the lever 52. The cable 60 extends through the sheath 64 and extends to the lever 50. The pivoting of the lever 58 downward, pulls the cable 60 within the sheath 64 thereby converging the levers 50, 52 for counter rotation of the levers 50, 52 relative to each other. This counter rotation expands the torsion spring 48 permitting adjustment of the guide shaft 38 within the torsion spring 48.

By providing only one guide shaft 38, binding is eliminated that is associated with tolerances and misalignments when utilizing multiple guide shafts. Additionally, utilization of the spherical bushings 30, 32 also permits flexibility for compliance with tolerances and misalignments. By utilization of the guide shaft 38 with the torsion spring 48, multiple adjustment positions are permitted that are not limited to specific notches or detents. This positional flexibility is often referred to as infinitely adjustable.

With reference to FIGS. 2-4, 8 and 9, a drum spring return mechanism 68 is supported upon the frame 24 with a distal end 70 extending from the mechanism 68 and connecting to a hook 72 on the bracket 42. The drum spring mechanism 68 provides a constant force on the bracket 42 and consequently the head restraint 12 to bias the head restraint 12 to a forwardmost position when unlocked from the locking mechanism 20. Thus, the head restraint assembly 10 provides one-handed operation for adjustment in the fore and aft direction. The occupant does not need to pull the head restraint 12 forward. By unlocking the locking mechanism 20, the head restraint 12 travels to a forward position. The occupant can move the head restraint 12 rearward, when the locking mechanism is unlocked by pressing his or her head rearward against the head restraint in order to obtain a desired position.

Figure 6:
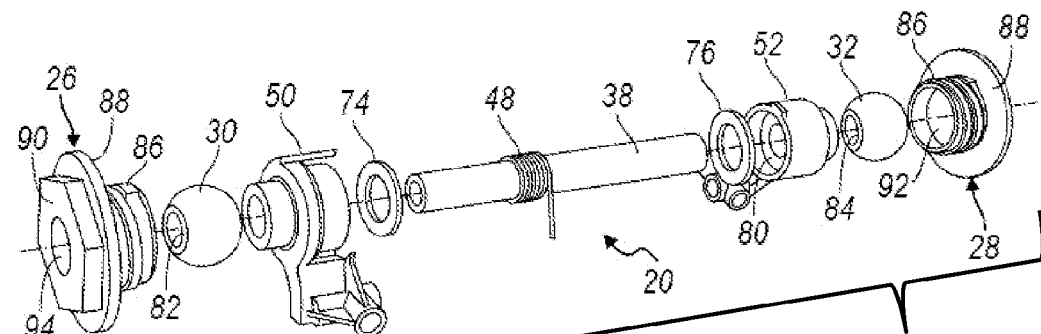
FIG. 6 is an exploded perspective view of the locking mechanism of FIG. 2.
Figure 7:
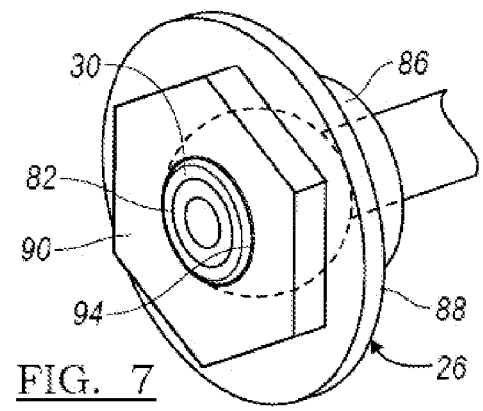
FIG. 7 is an enlarged perspective view of an end of the guide assembly of FIG. 2.

With reference now to FIGS. 2, 5 and 6, a pair of washers 74, 76 is provided about the guide shaft 38 with the torsion spring 48 between the washers 74, 76. The washers 74, 76 are each received within a bore 78, 80 within each of the levers 50, 52. The spherical bushings 30, 32 each include an aperture 82, 84 formed through the bushing 30, 32. The apertures 82, 84 each have a constant diameter sized for a clearance fit over the guide shaft 38.

In FIGS. 2, 5-8 and 10-12, the nuts 26, 28 are illustrated in greater detail. Each of the nuts 26, 28 include a threaded body 86 for threaded in engagement during installation into the frame 24. A flange 88 is provided on the body 86 for providing a limit of axial translation during installation into the frame 24. A series of wrench flats 90, such as a hexagonal bolt head, are provided outboard of the flange 88. Each of the nuts 26, 28 include a socket 92 within the body 86 for receiving the corresponding bushing 30, 32 therein. The socket 92 may have any suitable shape for receiving the corresponding bushing 30, 32. For example, the socket 92 may be hemispherical, conical or the like. A clearance aperture 94 is formed through the bolt head 90 that is greater than a diameter of the guide shaft 38 for permitting clearance to the guide shaft 38. The nuts 26, 28 may be formed from a structural plastic, such as nylon with fillers for withstanding applicable loading, minimizing friction with the bushings 30, 32, and for withstanding the environment within a vehicle.

Figure 8:
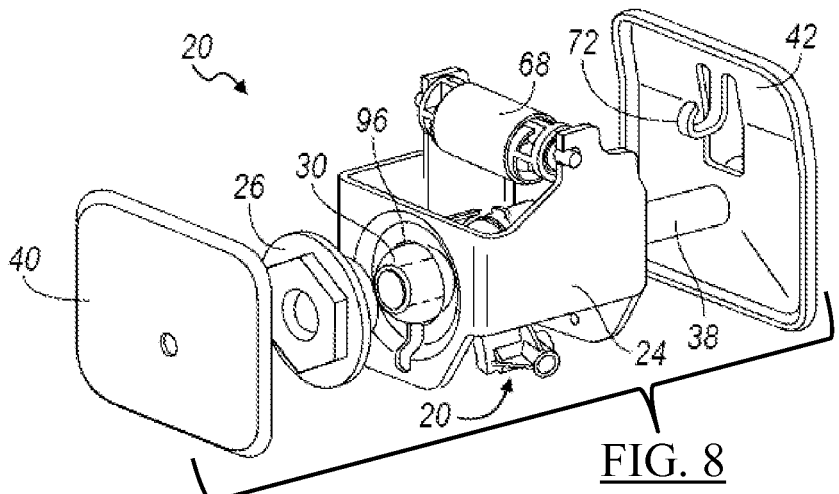
FIG. 8 is a partially exploded perspective view of the head restraint of FIG. 1.
Figure 9:
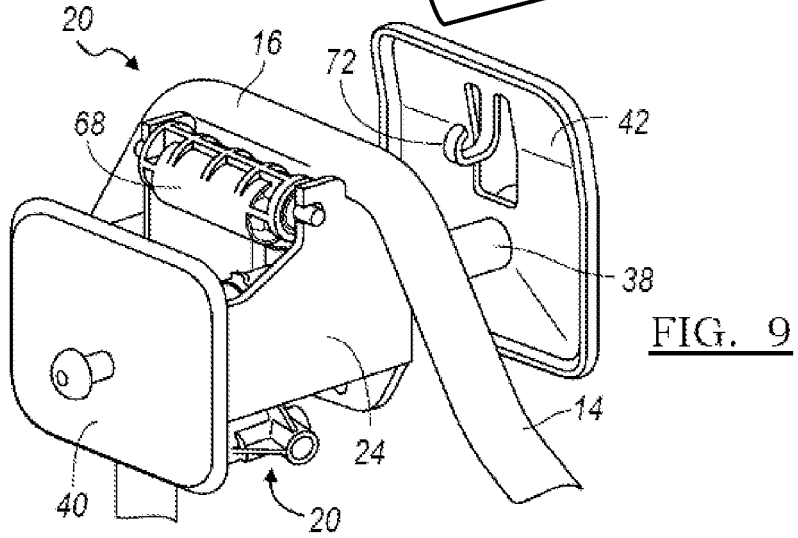
FIG. 9 is a partial perspective view of the head restraint of FIG. 1.
Figure 10:
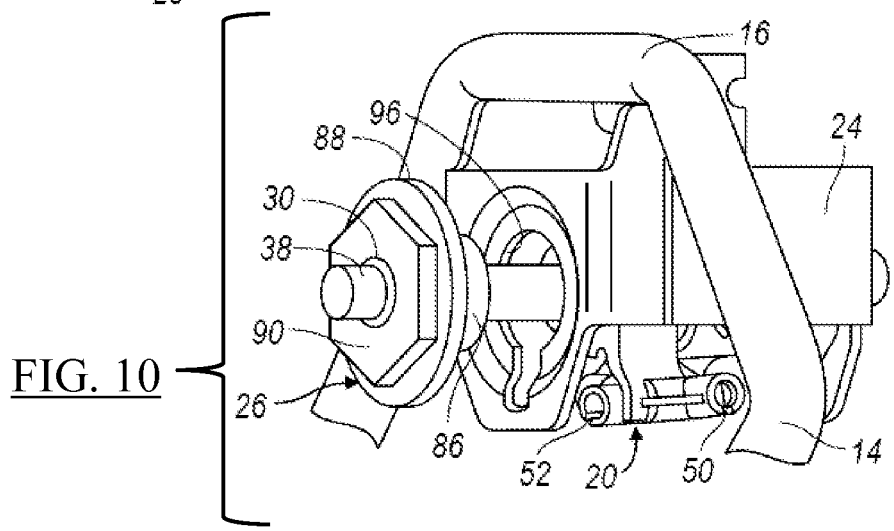
FIG. 10 is a partially exploded perspective view of the guide assembly of FIG. 2.
Figure 11:
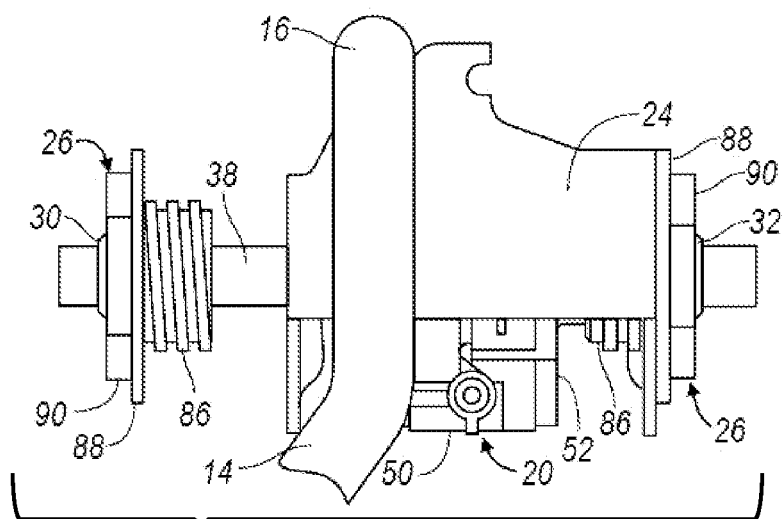
FIG. 11 is a partially exploded side view of the guide assembly of FIG. 2.

With reference now to FIGS. 8, 10 and 12, one of the nuts 26 is illustrated during installation to the frame 24. The frame 24 includes a pair of helically stamped apertures 96, 98 for receiving the threaded bodies 86 of the nuts 26, 28. The threaded engagement permits installation and adjustment of the nuts 26, 28 into the frame 24. The bodies 86 may be molded oversized relative to the frame apertures 96, 98 for providing a friction fit for resisting loosening after installation. The nuts 26, 28 permit attachment without additional fasteners.

The utilization of the spherical bushings 30, 32 permits adjustment along the guide shaft 38 without binding caused by unevenly applied forces upon the head restraint 12. The spherical bushings 30, 32 also compensate for tolerances. The spherical bushings 30, 32 in combination with the torsion spring 48 and levers 50, 52 remove many components and complexities associated with prior art guide assemblies and locking mechanisms. The linear movement is provided without a linkage thereby removing moving parts that add to weight, cost, buzz, squeak and rattle.

With fore/aft adjustment executed along a single horizontal guide shaft 38, loading that is offset from an axis of the shaft 38 can exaggerate fore/aft free-play. Stack-up of the components assembled along the guide shaft 38 also exaggerate fore/aft free-play. Resistance to fore/aft adjustment may be present due to misalignment. The potential exaggerated free-play and resistance is minimized by the spherical bushings 30, 32.

Figure 13:
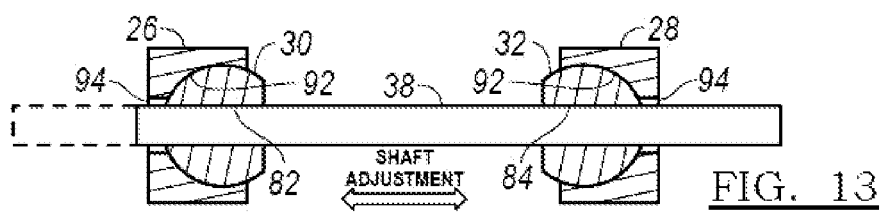
FIG. 13 is a schematic view of the guide assembly of FIG. 2, illustrated in alignment.
Figure 14:
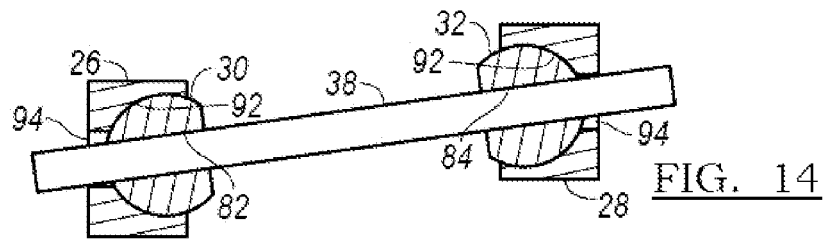
FIG. 14 is another schematic view of the guide assembly of FIG. 2, illustrated in misalignment.

FIGS. 13 and 14 are schematic views of the nuts 26, 28, the spherical bushings 30, 32, and the guide shaft 38. In FIG. 13, all are aligned for smooth adjustment of the head restraint 12 due to translation of the guide shaft 38 relative to the nuts 26, 28. FIG. 14 illustrates how misalignment is compensated by pivoting of the spherical bushings 30, 32 within the sockets 92 for permitting free linear translation of the shaft 38 relative to the bushings 30, 32. The clearance apertures 94 are sized to accommodate acceptable angular tolerances or misalignments to prevent the guide shaft 38 from interfering with the nuts 26, 28.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A head restraint assembly comprising:
    a first guide member adapted to be mounted proximate to a seat back;
    a second guide member mounted to the first guide member for translation along the first guide member;
    at least one spherical bushing connecting the second guide member to the first guide member; and
    a locking mechanism mounted to the second guide member in cooperation with the first guide member to lock the second guide member relative to the first guide member;
    wherein the second guide member comprises a guide shaft;
    wherein the guide shaft is generally cylindrical;
    wherein an aperture is formed through each spherical bushing to receive the guide shaft with a clearance fit;
    wherein the locking mechanism is provided on the guide shaft; and
    wherein the locking mechanism comprises:
        a torsion spring oriented about the guide shaft and sized to tighten about the guide shaft and lock to a position upon the guide shaft,
        a pair of levers each pivotally mounted to the guide shaft, and each operably connected to an end of the torsion spring, and
        a pair of washers provided about the guide shaft, each of the pair of washers oriented between the torsion spring and one of the levers.

2. The head restraint assembly of claim 1 wherein the first guide member and the second guide member provide linear adjustment without an additional linkage offset from the first guide member and the second guide member.

3. The head restraint assembly of claim 1 wherein a bore is formed in each of the pair of levers; and
    wherein one of each of the pair of washers is oriented within one of the bores.

4. The head restraint assembly of claim 1 wherein the at least one spherical bushing is formed from a structural plastic.

5. The head restraint assembly of claim 1 further comprising:
    at least one support post adapted to be mounted to a seat back, wherein the first guide member is mounted to the at least one support post;
    a frame mounted to the at least one post, wherein the first guide member is supported by the frame; and
    a pair of nuts mounted to the frame to retain the at least one spherical bushing, wherein each of the pair of nuts comprises a threaded body to fasten into the frame.

6. The head restraint assembly of claim 5 wherein the frame includes a pair of helically stamped apertures to receive the threaded bodies of the nuts.

7. A seat assembly comprising:
    a seat bottom;
    a seat back extending upright from the seat bottom; and
    a head restraint assembly according to claim 1.

8. The seat assembly of claim 7 wherein at least one of the seat bottom and the seat back is adapted to be mounted to a vehicle.

9. A head restraint assembly comprising:
    a first guide member adapted to be mounted proximate to a seat back;
    a second guide member mounted to the first guide member for translation along the first guide member;
    at least one spherical bushing connecting the second guide member to the first guide member;
    a locking mechanism mounted to the second guide member in cooperation with the first guide member to lock the second guide member relative to the first guide member;
    at least one support post adapted to be mounted to a seat back, wherein the first guide member is mounted to the at least one support post;
    a frame mounted to the at least one post, wherein the first guide member is supported by the frame; and
    a pair of nuts mounted to the frame to retain the at least one spherical bushing, wherein each of the pair of nuts comprises a threaded body to fasten into the frame.

10. The head restraint assembly of claim 9 wherein the first guide member and the second guide member provide linear adjustment without an additional linkage offset from the first guide member and the second guide member.

11. The head restraint assembly of claim 9 wherein the second guide member comprises a guide shaft.

12. The head restraint assembly of claim 9 wherein each of the pair of nuts further comprises a flange provided on the body to limit axial translation during installation into the frame.

13. The head restraint assembly of claim 9 wherein each of the pair of nuts further comprises a series of wrench flats.

14. The head restraint assembly of claim 9 wherein the frame includes a pair of helically stamped apertures to receive the threaded bodies of the nuts.

15. The head restraint assembly of claim 14 wherein the threaded bodies are oversized relative to the apertures in the frame to provide a friction fit.

16. A seat assembly comprising:
    a seat bottom;
    a seat back extending upright from the seat bottom; and
    a head restraint assembly according to claim 9.

17. The seat assembly of claim 16 wherein at least one of the seat bottom and the seat back is adapted to be mounted to a vehicle.

18. The head restraint assembly of claim 9 wherein each of the nuts includes a socket formed within the body to receive one of the spherical bushings.

19. The head restraint assembly of claim 18 wherein the socket is generally hemispherical.

20. The head restraint assembly of claim 18 wherein a clearance aperture is formed through the threaded body, intersecting the socket for the second guide member to extend therethrough.

* * * * *